(12) United States Patent
Hayter

(10) Patent No.: US 8,090,876 B2
(45) Date of Patent: Jan. 3, 2012

(54) MESSAGE HANDLING BY A WRAPPER CONNECTED BETWEEN A KERNEL AND A CORE

(75) Inventor: Steven Hayter, Christchurch (GB)

(73) Assignee: Bridgeworks Limited, Dorset (GB)

( * ) Notice: Subject to any disclaimer, the term of this patent is extended or adjusted under 35 U.S.C. 154(b) by 897 days.

(21) Appl. No.: 11/724,236

(22) Filed: Mar. 15, 2007

(65) Prior Publication Data

US 2007/0288568 A1 Dec. 13, 2007

(30) Foreign Application Priority Data

Mar. 29, 2006 (GB) .................................. 0606307.7

(51) Int. Cl.
*G06F 15/16* (2006.01)
(52) U.S. Cl. .......................... 709/246; 709/249; 711/147
(58) Field of Classification Search .................... 709/246
See application file for complete search history.

(56) References Cited

U.S. PATENT DOCUMENTS

| | | | | |
|---|---|---|---|---|
| 6,418,352 | B1* | 7/2002 | Ellis et al. ...................... | 700/116 |
| 6,470,393 | B1* | 10/2002 | Heinrich et al. .............. | 709/238 |
| 6,981,265 | B1* | 12/2005 | Rees et al. ..................... | 719/313 |
| 2003/0236919 | A1* | 12/2003 | Johnson et al. ............... | 709/251 |
| 2004/0015762 | A1* | 1/2004 | Klotz et al. .................... | 714/742 |
| 2004/0064814 | A1 | 4/2004 | Bowers et al. | |
| 2005/0165965 | A1* | 7/2005 | Henry et al. .................. | 709/249 |
| 2005/0201386 | A1* | 9/2005 | Thompson ................ | 370/395.52 |
| 2006/0015655 | A1* | 1/2006 | Zur et al. .......................... | 710/5 |
| 2006/0129650 | A1* | 6/2006 | Ho et al. ....................... | 709/207 |
| 2006/0218388 | A1* | 9/2006 | Zur et al. .......................... | 713/2 |
| 2006/0248292 | A1* | 11/2006 | Suresh .......................... | 711/154 |
| 2007/0156974 | A1* | 7/2007 | Haynes et al. ................ | 711/147 |
| 2007/0168693 | A1* | 7/2007 | Pittman ............................. | 714/4 |

FOREIGN PATENT DOCUMENTS

EP 1001337 A2 5/2000

OTHER PUBLICATIONS

European Search Report dated May 10, 2006 for Application No. GB0606307.7.

* cited by examiner

*Primary Examiner* — Firmin Backer
*Assistant Examiner* — Hamza Algibhah
(74) *Attorney, Agent, or Firm* — Banner & Witcoff, Ltd

(57) ABSTRACT

A wrapper operates to store data relating to messages received from a kernel such that kernel-specific data or information is not passed to a module core. The wrapper on receiving data from the module core uses the data stored in the relevant part of the memory to provide the data or information required by the kernel to handle the message. On receiving a message, the kernel begins to process it. At a certain point the wrapper intercepts the message and creates a SCSI data message and a PLUT element comprising a kernel pointer, a core pointer, and a reference counter. The kernel pointer is provided by the kernel and identifies a memory location where implementation-specific information pertaining to the message, pointers to raw data and a SCSI-formatted command descriptor block resides. The reference counter defines the number of times a message will be processed within the core before the related memory can be reused. The wrapper reformats data and references the result by the core pointer.

13 Claims, 5 Drawing Sheets

MESSAGE HANDLING BY A WRAPPER CONNECTED BETWEEN A KERNEL AND A CORE

FIELD OF THE INVENTION

The invention relates to apparatus comprising first and second network connections, processor means and memory, the processor means and the memory together operating to implement a kernel, a core and a wrapper, and to a method of operating apparatus comprising first and second network connections, processor means and memory, the processor means and the memory together operating under software control to implement a kernel, a core and a wrapper.

BACKGROUND TO THE INVENTION

It is known to connect two networks together with a bridge. The networks may be of the same type, or they may be of different types. Example network types are SCSI (Small Computer Serial Interface), Fibre Channel, ISCSI (Internet SCSI), ATA (Advanced Technology Attachment), Serial ATA, Infiniband and Serial Attached SCSI, although there are many others. Bridges often connect a network to which a number of host stations are connected to a SAN (storage area network), although they can also be put to other uses. As well as performing any necessary communication protocol conversion, bridges can provide some additional functionality. Examples of bridges are the Potomac and Tamar bridge products vended by Bridgeworks Limited of 135 Somerford Road, Christchurch, Dorset, United Kingdom.

The invention is concerned with improvements to the arrangements of bridges, although it also has broader application than this.

SUMMARY OF THE INVENTION

According to a first aspect of the invention, there is provided apparatus comprising first and second network connections, processor means and memory, the processor means and the memory together operating to implement a kernel, a core and a wrapper, wherein the wrapper is connected between the kernel and the core so as to provide separation thereof and wherein:
  the core comprises plural software modules arranged sequentially for handling or control of data as it is passed between the first and second network connections, and
  the kernel is arranged to interface to the first and second network connections,
  and the wrapper is operable:
    to intercept a message being processed by the kernel,
    to generate an identifier and to associate the identifier with the intercepted message,
    to store a data element comprising a kernel reference, the kernel reference having been received from the kernel, and the identifier, and
    to pass the identifier with the message to the core, the wrapper also being operable on receiving a message from the core:
    to identify the stored data element including the identifier, and
    to pass to the kernel the corresponding kernel reference and the message received from the core.

An advantage of the invention is a reduction in the probability of corruption of a reference to the memory at which the kernel stores data corresponding to the message. If the memory reference is corrupted, the kernel may process data from a wrong memory location. Clearly this could have catastrophic consequences for stored data and for the programs which utilise the memory.

Another advantage of the invention is that it can provide portability to the software comprising the core in the sense that the core can be used with a kernel operating on a different operating system merely through use of a different wrapper.

Optionally, the wrapper is arranged upon intercepting a message to reformat data relating to the message from a format in which it is handled by the kernel to a format in which it can be handled by the core.

Advantageously the wrapper is arranged on intercepting a message being processed by the kernel: to monitor the number of occasions that the message is handled by the core, and in response to determining that the number of occasions that the message is handled by the core is equal to an expected number, releasing memory relating to the message.

Preferably the software which implements the kernel includes a command to jump to a location outside of the kernel, and wherein a pointer is provided at the location. This allows messages to be passed to the core for handling without requiring the provision in the kernel of conditional program steps to verify the connection of the wrapper. Furthermore, this also allows an off-the-shelf kernel, or a program that runs in kernel space, to be used without substantial modification. In this case, it is preferred that the pointer is dynamically modifiable to point to the core or to the wrapper. This allows the wrapper to be inserted into and/or removed from the on-the-fly.

To provide protection against errors, the wrapper may be arranged: to maintain a record of initiator devices connected to one of the network connections, on intercepting a message from an initiator device, determining whether the initiator device associated with the message corresponds to an initiator device included in the record of initiator devices maintained by the wrapper, and on a negative determination, to refrain from passing the intercepted message to the core. Here, for each initiator the wrapper may maintains a record including a reference for the initiator device used by the kernel and a wrapper generated reference for the initiator device. Preferably the wrapper generated reference comprises a hashed value of the kernel reference. This can reduce the computation required internally within the core when identifying and dealing with initiator references.

Advantageously the wrapper is arranged: to maintain a record of target devices connected to one of the network connections, on intercepting a message from an initiator device, determining whether the target device associated with the message corresponds to a target device included in the record of target devices maintained by the wrapper, and on a negative determination, passing the intercepted message for error handling by the core. This can provide protection against false targets, which is especially useful where targets can be used to spread viruses. Optionally, for each target device the wrapper maintains a record including a reference for the target device used by the kernel and a wrapper generated reference for the target device.

Advantageously, the kernel is constructed of open source program code. Since the wrapper separates the core from the kernel, the core then is not susceptible to meeting the disclosure requirements of open source software licenses attached to the kernel. This allows the core to be proprietary software which does not need to be released as open source.

According to a second aspect of the invention, there is provided a method of operating apparatus comprising first and second network connections, processor means and memory, the processor means and the memory together operating under software control to implement a kernel, a core and a wrapper, wherein the wrapper is connected between the kernel and the core so as to provide separation thereto, the core comprises plural software modules arranged sequentially for handling or control of data as it is passed between the first and second network connections, and the kernel is arranged to interface to the first and second network connections, the method comprising at the wrapper:

intercepting a message being processed by the kernel, generating an identifier and associating the identifier with the intercepted message, storing a data element comprising a kernel reference, the kernel reference having been received from the kernel, and the identifier, and passing the identifier with the message to the core, the method also comprising at the wrapper on receiving a message from the core:

identifying the stored data element including the identifier, and passing to the kernel the corresponding kernel reference and the message received from the core.

Embodiments of the invention will now be described by way of example only with reference to the accompanying drawings.

DETAILED DESCRIPTION OF THE PREFERRED EMBODIMENTS

Figure 1:
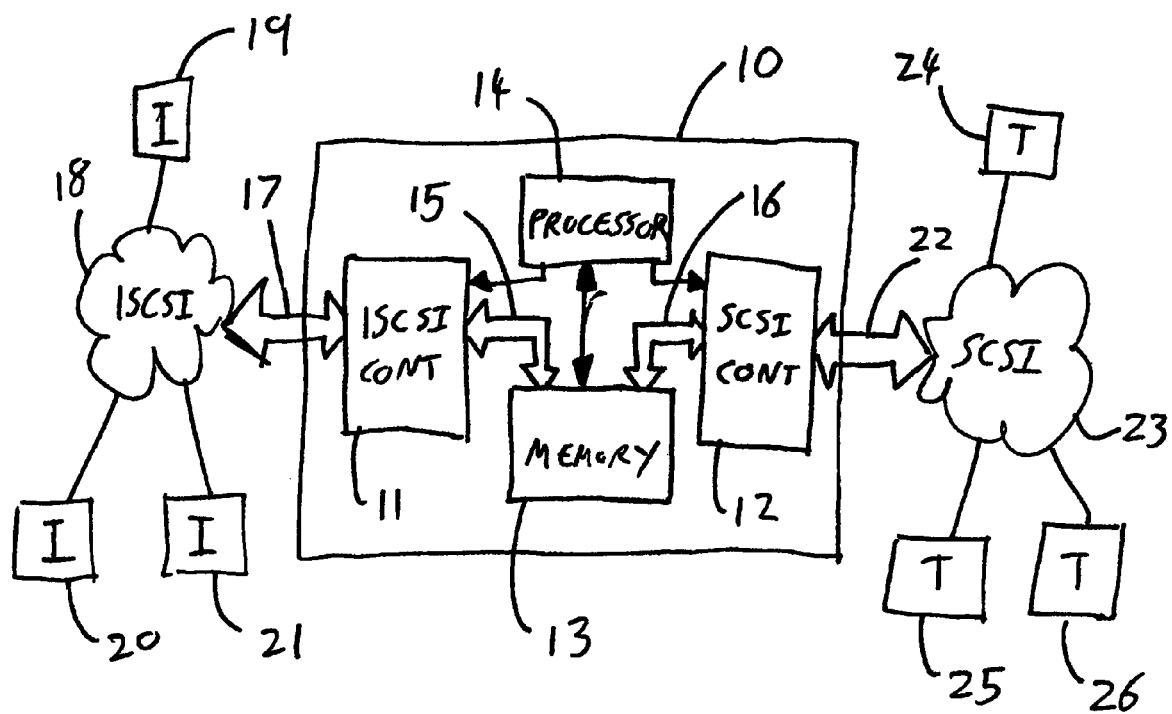
FIG. 1 is a schematic drawing illustrating apparatus according to and operating according to the invention in the form of a bridge connected between two networks.

In the Figures, the same reference numerals are used for like elements throughout.

Referring to FIG. 1, a bridge 10 includes an iSCSI controller 11, which here includes an associated IP (Internet Protocol) controller, a SCSI controller 12, a memory 13 and a processor 14. The processor effects control over the iSCSI and SCSI controllers 11, 12, and is operable with the memory 13 to execute software so as to perform its functions. Software is permanently stored in non-volatile memory (not shown). This software includes an operating system, upon which the bridge runs application software. The iSCSI and SCSI controllers 11, 12 are connected by respective internal buses 15, 16 to the memory 13. Clearly this Figure is merely schematic; the bridge also includes a power supply along with various other components not relevant to this explanation.

The iSCSI controller 11 is connected via an iSCSI connector 17 to a first network, here an IP network 18. In practice, the IP network 18 is able to carry IP (Internet Protocol) packets. iSCSI is a standard developed to allow SCSI packets to be carried within IP packets. An iSCSI packet basically comprises a SCSI packet as the payload of an IP packet including an IP header. Thus, the IP network 18 can also be termed an iSCSI SAN network. Connected to the iSCSI network 18 are a number of workstations, illustrated in the Figure as first, second and third Initiators 19, 20, 21.

The SCSI controller 12 is connected via an SCSI connector 22 to a second network, here in the form of an SCSI bus 23. Connected to the SCSI bus 23 are a number of storage devices, illustrated in the Figure as first, second and third Targets 24, 25 and 26.

The bridge 10 serves to connect devices on the first network 18 with devices on the second network 23. In this example, the bridge allows iSCSI devices in the form of the first, second and third Initiators 19, 20, 21 to utilise SCSI storage devices, such as hard disk or tape devices, in the form of the first, second and third Targets 24, 25 and 26 together comprising a SAN for storage of data and for the retrieval of data therefrom. As is described below, the bridge handles data in SCSI format. However, it will be understood that the invention is not limited to these network types, nor is it limited to the provision of access to a SAN nor to the handling of SCSI data.

Figure 2:
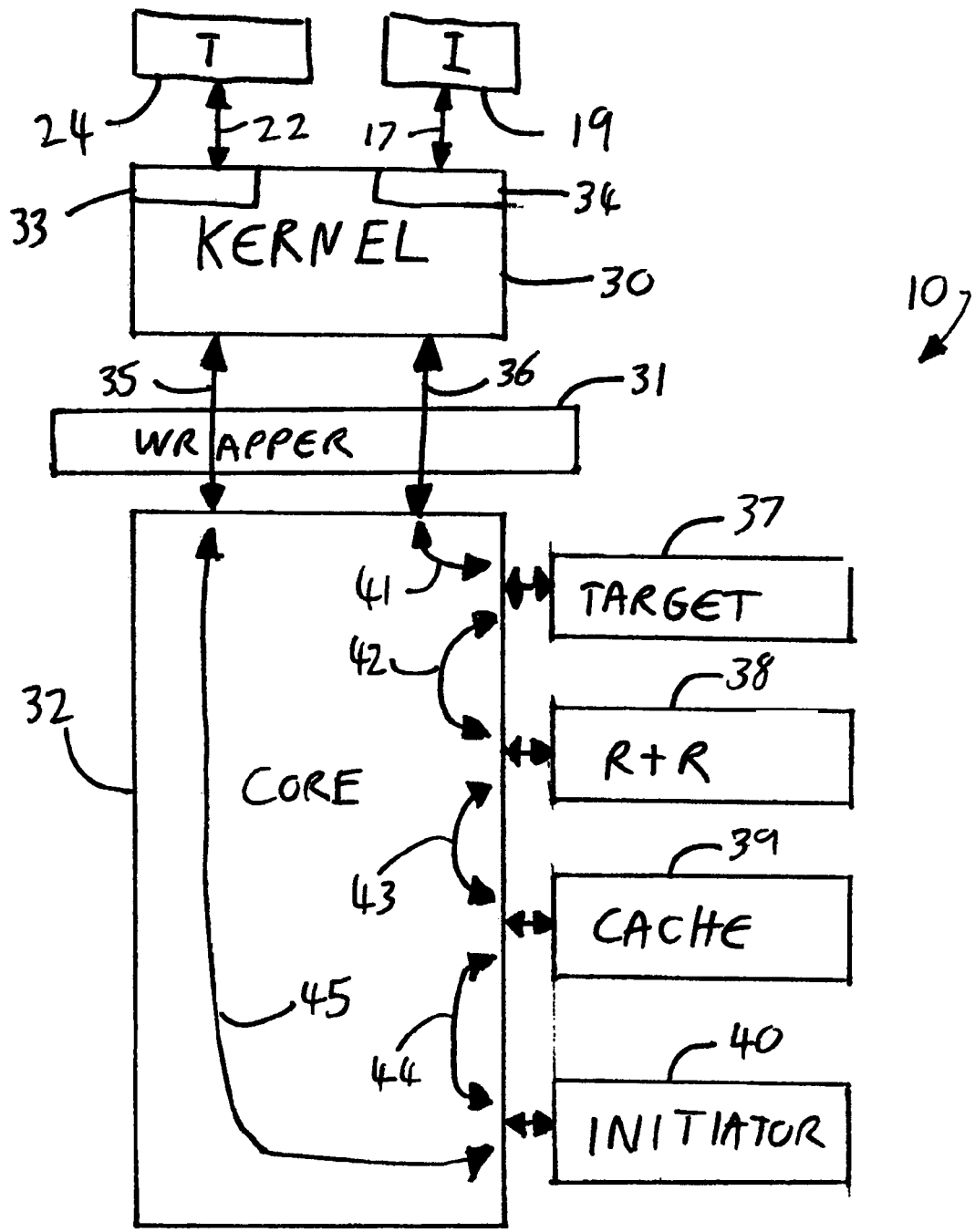
FIG. 2 is a schematic drawing illustrating in more detail some of the components of the FIG. 1 bridge and its operation.

Referring now to FIG. 2, the bridge is shown in more detail. The bridge 10 is divided into functional blocks. In particular, the bridge comprises a kernel 30, a wrapper 31 and a core 32. The kernel 30 includes a SCSI interface portion 33, which is connected bidirectionally via the SCSI connector 22 to a Target 24. The kernel also includes an IP interface portion 34, which is connected bidirectionally via the iSCSI connector 17 to an Initiator 19. The SCSI interface portion 33 includes the IP controller 12 and some associated software. The IP interface portion 34 includes the IP controller 11, an Ethernet driver and some TCP/IP software. First and second bidirectional wrapper paths 35, 36 are made from the kernel through the wrapper 31 to the core 32.

The module core 32 includes an iSCSI target module 37, a reserve and release module 38, a cache module 39 and an SCSI initiator module 40 connected in series between the second bidirectional wrapper path 36 and the first bidirectional wrapper path 35. In particular, a first core path 41 connects the second bidirectional path 36 to the iSCSI target module 37, a second core path 42 connects the iSCSI target module 37 to the reserve and release module 38, a third core path 43 connects the reserve and release module 38 to the cache module 39, a fourth core path 44 connects the cache module 39 to the SCSI initiator module 40, and a fifth core path 45 connects the SCSI initiator module 40 to the first bidirectional path 35.

Each module, namely the iSCSI target module 37, the reserve and release module 38, the cache module 39 and the SCSI initiator module 40, is a software module. Each module 37, 38, 39 and 40 operates on a respective thread of the operating system. Thus, the modules 37, 38, 39 and 40 operate in parallel to one another.

On power-up of the bridge 10, the bridge is initialized. This is a three stage process. Firstly the memory 13 is preset. This sets up the memory in advance of operation of the bridge 10, and avoids the need to allocate memory on-the-fly. In this connection, the memory is preset to store information about modules, flags, pointers to queues, pointers to names and unique module identifiers. The second stage comprises resource allocation. In this stage, allocation is made for resources needed for the paths (for data and other communications) between modules 37, 38, 39 and 40, e.g. queues, semaphores and mutexes. These resources are allocated specifically for the modules 37, 38, 39 and 40. In the third stage, the modules 37, 38, 39 and 40 are initiated. Each module has its own initiation function, e.g. concerning the caches needed for each target and initiator device. The operation of the modules in processing messages and data is described.

Briefly, when a message, such as a command, is received from the initiator 19 at the IP interface portion 34, limited processing of it is performed by the kernel 30. After this limited processing, the kernel 30 stores information relating to the message, the raw data associated with the message, pointers to the raw data, and one or more IP addresses in the memory 13. The kernel 30 then produces one or more pointers to the message. The one or more pointers to the message then are passed to the wrapper 31, which uses the pointer(s) to obtain the message from the memory 13, and performs some modification of certain components of the message, as is described in more detail below. The modified message then is passed via the first path 41 to the iSCSI target module 37. The iSCSI target module 37 extracts various items of information from the received modified message. The information that the iSCSI target module 37 extracts from the modified message includes: a pointers to a command description block (CDB), one or more pointers to the raw data, information identifying the number of pointers to raw data, a pointer to the target device that the message relates to, for instance a pointer to the target 24, a pointer to the initiator device 19, a pointer to the next data, an identifier which is unique to the SCSI data packet, a number of SCSI data flags (identified below), a reference count, information identifying the expected length of the data, information identifying the actual length of the data, a hash of the unique identifier of the initiator device, and a generic reason code.

The blocks of raw data for a message normally are stored sequentially in the memory 13. The pointer to the next data might be a pointer to data associated with a different message, and may be concerned with a different target device and/or a different initiator device. The hash of the unique identifier of the initiator device is used in place of the unique identifier itself since it has been found just as effective yet utilises a significantly reduced data overhead. The generic reason code can be used to reset modules, amongst other things.

The SCSI data flags indicate whether SCSI is cacheable, whether a SCSI CDB is sent, whether SCSI data is awaited, whether a SCSI reply is sent, whether the SCSI command has been sent to the SCSI controller 33, whether a SCSI device is awaiting release and whether a SCSI device is awaiting reserve.

The generic reason code is either a general reason, a task management request reason or a response reason. The available general reasons are: fatal error, not supported, system shutdown and module shutdown. Typical iSCSI task management request reasons are: abort task, abort task set, clear ACA, clear task set, logical unit reset, target warm reset, target cold reset and task reassign. The available response reasons are: good, rejected, task non-existent, LUN (logical unit number) non-existent, task allegiant and authorization failure.

The SCSI data message is processed by the iSCSI target module 37 according to the function provided by the software comprising the target module. The iSCSI target module 37 is the module that communicates most directly with the initiator 19. The SCSI Initiator module 40 serves as an interface to the protocol that the target 24 uses. When the iSCSI target module 37 has finished processing the iSCSI data message, the result is forwarded to the reserve and release module 38 via the second path 42. The SCSI data message passed to the reserve and release module 38 may have been modified by the iSCSI target module 37. Alternatively or additionally, the raw data pointed at by the pointers forming part of the SCSI data message may have been modified by the target module. The particular modification effected by the iSCSI target module 37 is not important to this explanation so is not described in detail here.

The SCSI data message received from the iSCSI target module 37 is processed by the reserve and release module 38 according to the function provided by the software comprising that module. In some cases, the reserve and release module 38 will return the SCSI data packet to the iSCSI target module 37 with a modified generic reason code. Normally, though, the reserve and release module 38 merely passes the SCSI data message via the third path 43 to the cache module.

The SCSI data message received from the reserve and release module 38 is processed by the cache module 39 according to the function provided by the software comprising the cache module. If the originating message is a data write command, the processing effected by the cache module 39 processes the SCSI data message to modify it in such a way as to cause later the target device 24 to perform the required action. When the cache module 39 has finished processing the SCSI data message, the resulting iSCSI data message is forwarded to the SCSI initiator module 40 via the fourth path 44. Depending on the contents of the SCSI data message and the programmed function of the cache module 39, the cache module may also send a SCSI data message back to the reserve and release module 38 for passing onwards to the initiator 19.

The SCSI data message received from the cache module 39 is processed by the SCSI initiator module 40 according to the function provided by the software comprising the initiator module. The SCSI initiator module 40 is the module that communicates most directly with the target 24. The SCSI initiator module 40 serves as an interface to the protocol that the initiator 19 uses.

When the SCSI initiator module 40 has finished processing the SCSI data message passed to it by the cache module 39, the resulting SCSI data message is forwarded to the wrapper 31 via the fifth path 45. The SCSI data message passed to the wrapper 31 may have been modified by the SCSI initiator module 40. Alternatively or additionally, the raw data pointed at by the pointers forming part of the SCSI data message may have been modified by the SCSI initiator module 40. The particular modification effected by the SCSI initiator module 40 is not important to this explanation so is not described in detail here.

The wrapper 31 performs some translation of certain components of the iSCSI data message and passes the result to the kernel 30. The kernel 30 uses pointers and other information provided by the wrapper 31 to retrieve the information relating to the message, the raw data associated with the message, the pointers to the raw data, etc., and performs additional processing. The kernel then uses the SCSI interface portion 33 to send a suitable SCSI message to the target 24.

The bridge 10 functions similarly in the opposite direction. In particular, when a message, for instance a SCSI response (generated in response to a received command), is received from a target device, such as the target 24, limited processing of it is performed by the kernel 30. The kernel 30 stores information relating to the message, the raw data associated with the message, pointers to the raw data, one or more IP addresses, etc. The message then is passed to the wrapper 31, which performs some modification of certain components of the message, as is described in more detail below. The modified message then is passed via the fifth core path 45 to the SCSI initiator module 40 as a SCSI data message including various items of information. The information that the SCSI data message includes is the same as that described above.

The SCSI data message is processed by the SCSI initiator module 40 according to the function provided by the software comprising the initiator module. The processing of the SCSI initiator module 40 when operating on SCSI data messages passing in this direction is likely to be quite different to the processing performed on SCSI data messages passing in the opposite direction. This difference arises from differences in the contents of the SCSI data packets, and not from the initiator module responding differently depending on the direction in which the SCSI data packet is being sent. The resulting SCSI data packet is passed via the fourth core path 44 to the cache module 39.

The SCSI data message received from the SCSI initiator module 40 is processed by the cache module 39 according to the function provided by the software comprising the cache module. When the cache module 39 has finished processing the SCSI data message, the result may be forwarded to the reserve and release module 38 via the third path 43. Alternatively, a SCSI data message may be returned to the SCSI initiator module 40. Depending on the contents of the SCSI data message received at the cache module 38 over the third path 43 and the programmed function of the cache module 39, the cache module may also send a SCSI data message back to the SCSI initiator module 40.

The SCSI data message received from the cache module 39 is processed by the reserve and release module 38 according to the function provided by the software comprising that module. In some cases, the reserve and release module 38 will return the SCSI data packet to the cache module 39 with a generic modified reason code. Normally, though, the reserve and release module 38 merely passes the SCSI data message via the second path 42 to the iSCSI target module 37.

The SCSI data message received from the reserve and release module 38 is processed by the iSCSI target module 37 according to the function provided by the software comprising the target module. The target module 40 serves as an interface to the protocol that the target 24 uses. When the iSCSI target module 37 has finished processing the SCSI data message, the resulting SCSI data message is forwarded to the wrapper 31 via the second path 42. The SCSI data message passed to the wrapper 31 may have been modified by the iSCSI target module 37. Alternatively or additionally, the raw data pointed at by the pointers forming part of the SCSI data message may have been modified by the target module.

The cache module 39 passes-through commands and responses without any modification thereof. In particular, when it receives a SCSI data message relating to a cacheable command (such as a write command) from an initiator device, the cache module 39 processes the command and passes a suitably modified SCSI data message to the appropriate SCSI storage target device. On subsequently receiving a response from the SCSI storage target device, as part of a SCSI data message, the cache module 39 passes a suitable SCSI data message back to the initiator device.

The wrapper 31 performs some translation of certain components of the SCSI data message and passes the result to the kernel 30. The kernel 30 uses pointers and other information provided by the wrapper to retrieve the information relating to the message, the raw data associated with the message, the pointers to the raw data, the one or more IP addresses, and the iSCSI message formatted descriptor block stored in the memory 13 by the kernel previously, and performs additional processing. The kernel then uses the IP interface portion 34 to send a suitable iSCSI message to the initiator 19.

Figure 3:
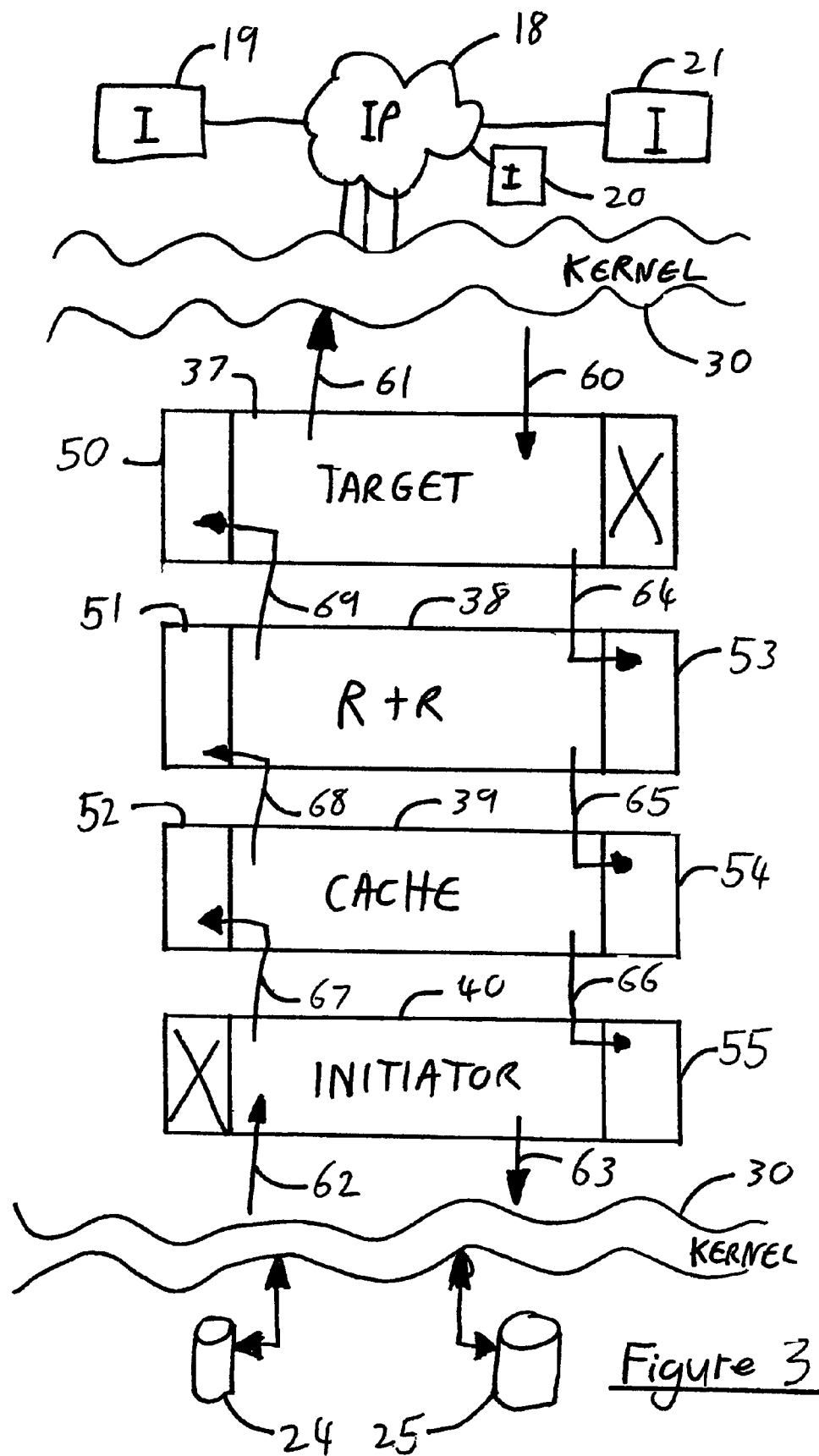
FIG. 3 is a schematic drawing illustrating in more detail some other of the components of the FIG. 1 bridge and its operation.

The bridge 10 includes queues for SCSI data messages being passed between modules, as will now be described with reference to FIG. 3. The bridge 10 shown in FIG. 3 is the same as the bridge of FIGS. 1 and 2, although more detail of the modules is shown and some components not relevant to this explanation are omitted. As shown in the Figure, the target module 37 includes a target from down queue 50, the reserve and release module 38 includes a reserve and release from down queue 51, and the cache module 39 includes a cache from down queue 52. The initiator module 40 does not include a from down queue. The term 'from down' is used because the queues 50, 51 and 52 are operable to receive messages from down the stack as show in the Figure, i.e. the queues are operable to receive messages from the module which is adjacent to and which has a higher priority than the module that includes it.

Similarly, the reserve and release module 38 includes a reserve and release from up queue 53, the cache module includes a cache from up queue 54 and the initiator module includes an initiator from up queue 55. The target module 37 does not include a from up queue.

A part of the memory 13 is allocated for each if the queues 50-55 as part of the second stage of the process performed on power-up, as described above. The amount of the memory 13 that is allocated for each of the queues 50-55 might be configurable or it might be fixed. In this example, the amount of memory allocated to each queue 50-55 is sufficient to store up to four SCSI data messages, although longer or shorter queues may be more suitable in some implementations.

Some messages are handled by one of the modules 50-55 without being queued. In particular, SCSI data messages received at the target module 37 from the kernel 30 over a first path 60 are passed directly into that module. SCSI data messages leaving the target module 37 for the kernel 30 follow a second path 61 without being queued. SCSI data messages received at the initiator module 40 from the kernel 30 follow a third path 62 directly into that module. SCSI data messages leaving the initiator module 40 for the kernel 30 follow a fourth path 63 without being queued.

However, SCSI data messages sent from a module towards an adjacent module are first placed in a queue of the destination module. Which of the queues of that module (if it has more than one queue) depends on whether the SCSI data message is being passed up or down the stack of modules. In particular, a SCSI data message passed from the target module 37 to the reserve and release module 38 is passed over a fifth path 64 into the reserve and release from up queue 53. A SCSI data message passed from the reserve and release module 38 to the cache module 39 is passed over a sixth path 65 into the cache from up queue 54. A SCSI data message passed from the cache module 39 to the initiator module 40 is passed over a seventh path 66 into the initiator from up queue 55. In the other direction, A SCSI data message passed from the initiator module 40 to the cache module 39 is passed over an eighth path 67 into the cache from down queue 52. A SCSI data message passed from the cache module 39 to the reserve and release module 38 is passed over a ninth path 68 into the reserve and release from down queue 51. A SCSI data message passed from the reserve and release module 38 to the target module 37 is passed over a tenth path 69 into the target from down queue 50.

For the period of time that it takes a module to write a SCSI data command to a queue 50-55 of an adjacent module 38-40, the queues for the module that the SCSI data message is being written to are locked.

The kernel 30 is constructed of program code, for example license-hostile software such as a GNU Linux kernel 30 or Hurd kernel 30. The kernel 30 is the core of an operating system, and thus provides secure access to hardware and to various computer processes. The kernel 30 includes first and second communication protocol handlers. These are the IP interface portion, or IP handler, 34 and the SCSI protocol handler 33 shown in FIG. 2, and include the ISCSI and SCSI controllers 11 and 12 respectively. The ISCSI and SCSI protocol handlers respectively provide implementation-specific methods for handling packets according to the iSCSI and SCSI protocols. According to agreements in place concerning the kernel 30, crudely speaking the only data that can be passed through the kernel 30 is raw data and data which is considered either to be plain numbers or to be in structures conforming to the specifications of a third party.

The wrapper 31 is connected between the kernel 30 and the module core 32. The wrapper 31 comprises software which communicates with the kernel 30 and with the module core 32. The wrapper 31 has the function of separating the kernel 30 from the module core 32 such that the module core 32 does not interface on any level with the kernel 30. The module core 32 can only be accessed via the wrapper 31. Another way to describe this is to say that the wrapper 31 maintains separation of the code bases of the kernel 30 and the module core 32.

The wrapper 31 operates to store data relating to messages received from the kernel 30 in the memory 13, such that kernel-specific data or information does not need to be, and is not, passed to the module core 32. The wrapper 31 on receiving data from the module core 32 uses the data stored in the relevant part of the memory 13 to provide the data or information required by the kernel 30 to handle the message. This is described in more detail below.

A desirable technical effect of this is a reduction in the probability of corruption of the reference to the memory at which the kernel 30 stores data corresponding to the message. If the memory reference is corrupted, the kernel 30 may process data from a wrong memory location. Clearly this can have catastrophic consequences for stored data and for the programs which utilise the memory. Since the kernel 30 memory reference is stored in the wrapper 31 and is not handled by the module core 32, the possibility of it being corrupted are reduced. If there is corruption of the corresponding reference which is handled by the module core 32, this results in an error but does not result in the kernel 30 operating on data from a wrong memory location.

Another desirable effect of this is that it provides portability to the software comprising the module core 32. In particular, the module core 32 can be used with kernels 30 operating on different operating systems merely through alteration of the interface code of the wrapper 31.

A further desirable effect is, to separate the module core 32 and the function of the module core 32 from the kernel 30 sufficiently that the module core 32 is not susceptible to meeting the disclosure requirements of licenses attached to the software comprising the kernel 30. The module core 32 can thus be proprietary software and does not need to be released as open source.

On initialisation, the wrapper 31 sets up a PLUT (Pointer Look-up Table) 70. The PLUT 70 includes plural elements, for instance 100 elements. Initially, all of the elements of the PLUT 70 are nulled.

Figure 4:
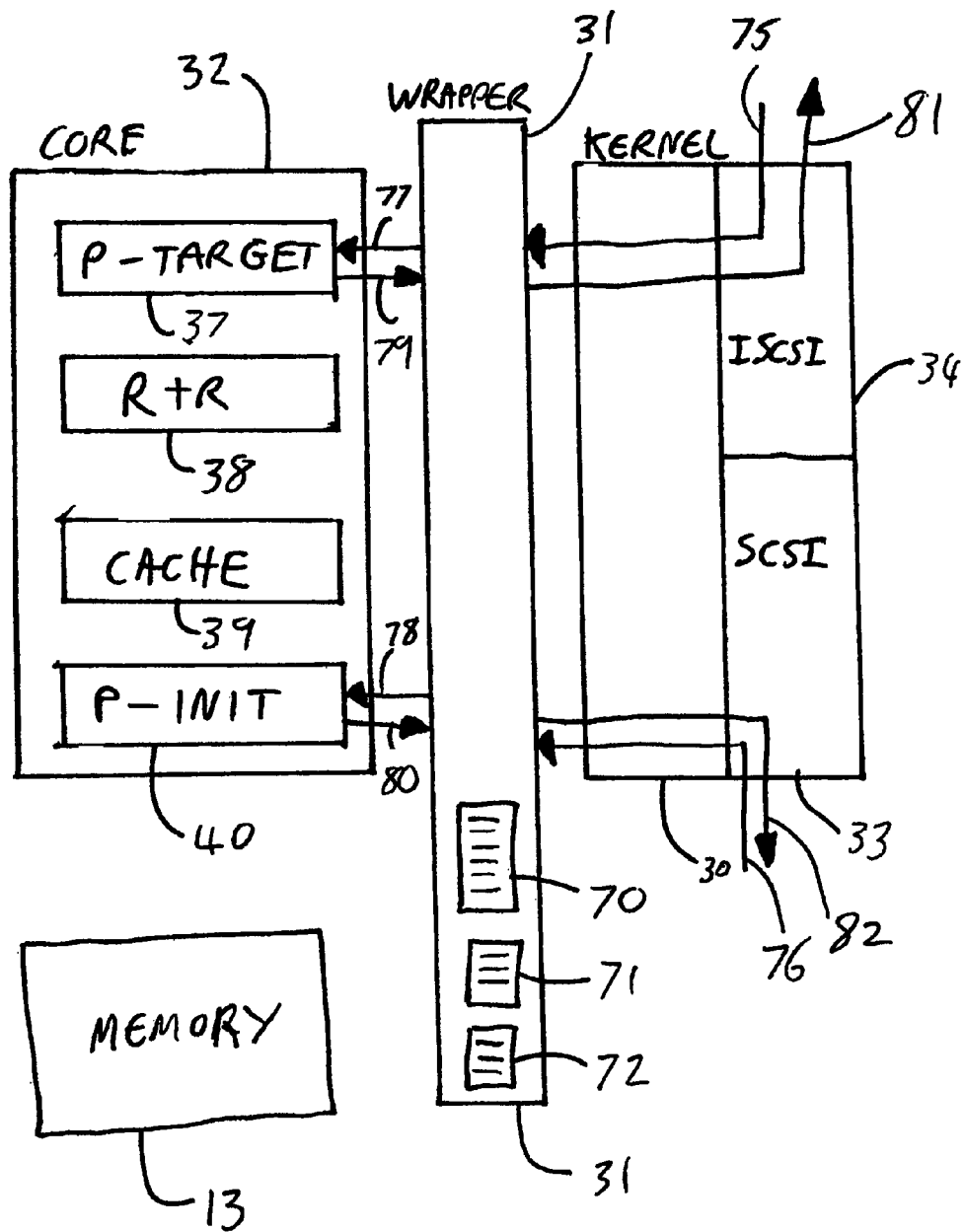
FIG. 4 is a schematic drawing illustrating in more detail different components of the FIG. 1 bridge and its operation.

On receiving a message, for instance a command or a response, and associated data from an initiator device 19-21 or from a target device 24-26, the kernel 30 begins to process it. At a certain point during the processing of the message by the kernel 30, the wrapper 31 intercepts the message. This is achieved without change to the original program or inserting conditional program steps to verify that the wrapper is inserted. The receiving and interception of a message received through the IP handler 34 is indicated at 75 in FIG. 4. The receiving and interception of a message received through the SCSI protocol handler 33 is indicated at 76 in FIG. 4.

The way in which a message is received and intercepted is as follows. The software which implements the kernel 30 includes a line of code which would normally pass the flow of the software outside the kernel 30. In particular, the software includes a command to jump to a particular location. Whereas conventionally, this jump would be to software code, instead the jump is to a pointer. By making the pointer a pointer to the beginning of code comprising a relevant part of the wrapper 31 or the beginning of code comprising a relevant part of the module core 32, modification of the pointer can include or not include the wrapper 31 in the bridge 10 as required. Moreover, the wrapper 31 can be inserted into the bridge 10 and removed from the bridge 10 on-the-fly without affecting operation of the bridge. This is possible since the module core 32 is able correctly to handle SCSI messages whether they are associated with references provided by the wrapper 31 or by the kernel 30. Moreover, this is achieved without providing the kernel 30 with code which determines whether or not the wrapper 31 is included; instead, control software needs only to change the pointer at the memory location that the kernel jumps to be a pointer to the module core 32 or the wrapper 31 as required.

Upon intercepting the message, the wrapper 31 creates a SCSI data message and a PLUT element for the message, and transcodes some data relating to the message. The SCSI data message is as described above. The PLUT element comprises a kernel pointer, a core pointer, and a reference counter. The kernel pointer comprises a pointer to memory. The kernel pointer is provided by the kernel 30, and identifies a Kernel Control Block memory location where implementation-specific information pertaining to the message, pointers to raw data and a SCSI-formatted command descriptor block resides.

Figure 5:
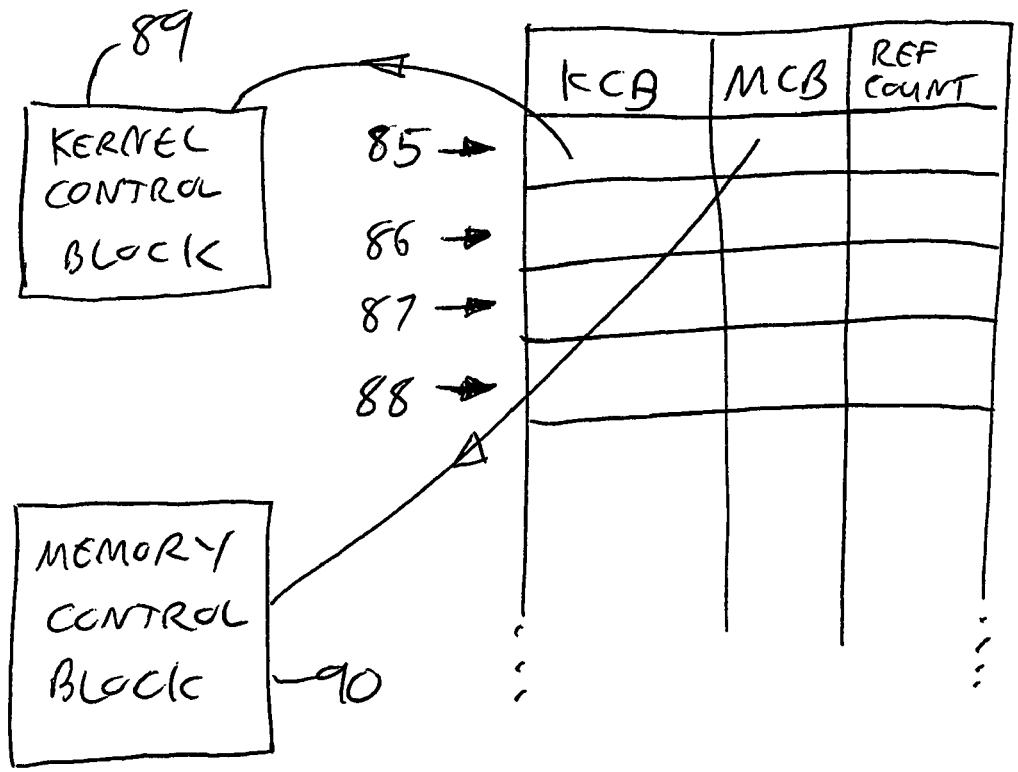
FIG. 5 is a schematic diagram of a pointer look-up-table forming part of the bridge.

The PLUT 70 is shown in more detail in FIG. 5. It is shown that the PLUT comprises plural PLUT entries 85-88. Each PLUT entry comprises a kernel pointer, a core pointer and a reference counter, as mentioned above. FIG. 5 illustrates that a kernel pointer in a first PLUT entry 85 is a pointer to a Kernel Control Block 89, and the core pointer in that PLUT entry is a pointer to a Memory Control Block 90.

The transcoding performed by the wrapper 31 comprises re-formatting it from a format in which it is handled by the kernel 30 to a format in which it can be handled by the module core 32. The transcoded data is then placed into the Memory Control Block 90 and referenced by the core pointer in the relevant PLUT entry.

The reference counter is an integer value. Generally speaking, the reference counter defines the number of times a message will be processed within the core 32 before the memory and PLUT table entries can be flushed and reused. Although the reference counter is initially set to two, the value of it is relatively quickly adjusted as necessary. The reference count depends on the content of the message, since it is the contents of the message that determine the number of times a processes is handled by the module core 32.

For instance, if the message relates to a read command, a target device discovery request or a response by a target device, the value of the reference count is set to one.

If the message relates to a write command, the value of the reference count is set to two. This is needed since the message control block, with its associated raw data, must be kept until the write command has been acknowledged by the SCSI interface 33 as having been completed without errors. In such a case as this, the cache module handles the message twice, firstly when it issues the write to the SCSI initiator 40 and secondly when the SCSI initiator passes a command complete status good to the cache module.

It will be appreciated how many messages are expected to result from a given message fed into the module core 32, and it is simple programming to effect generation of the reference count having the correct value.

The wrapper 31 then passes to the module core 32 a SCSI data message and the core pointer, but not the kernel pointer. The passing of a SCSI data message relating to a message received through the IP handler 34 is indicated at 77 in FIG. 4. The receiving and interception of a message received through the SCSI protocol handler 33 is indicated at 78 in FIG. 4. The module core 32 then handles the message, in particular by passing it to the sequence of modules 37-40 that reside in the module core 32. Each module 37-40 processes the message and the associated data according to the function of the module 37-40. Some modules 37-40 may be empty, in the sense that they do not effect any processing of the message and data but instead just pass the message and data through to the next module 37-40, or the wrapper 31 if there is no following module. In this example, the SCSI initiator module 40 and the iSCSI target module 37, which are the modules at the ends of the module stack and thus are the modules which are directly connected to the wrapper 31, are empty modules and effect no processing of data or messages. Each of the modules 37-40 passes the core pointer on to the next module 37-40 (or the wrapper 31) with its result, so that core pointer always points to the data and other information even if the data/information has been modified by one or more modules 37-40.

If the command is a simple request or other such unidirectional and simple command, a single message results at the final module 37, 40, after the data has been handled by all the other modules 37-40. This resulting message is provided by the module core 32 to the wrapper 31, along with the core pointer. Messages emanating from the module core 32 towards the IP handler 34 follow a path indicated at 79 in FIG. 4. Messages emanating from the module core 32 towards the SCSI protocol handler 33 follow a path indicated at 80 in FIG. 4.

On receiving a message from the module core 32, the wrapper 31 reads the core pointer associated with that message and identifies the corresponding PLUT element. The wrapper 31 then reads the kernel pointer from the PLUT element and passes the data and the kernel pointer, but not the core pointer, to the kernel 30. The kernel 30 then uses the kernel pointer to obtain from the memory 13 the information pertaining to the message that left the kernel 30 and went to the wrapper 31, and continues to process the data from the point at which the command was intercepted by the wrapper 31 according to the program code of the kernel 30. This further processing by the kernel 30 takes the necessary hardware actions needed for transmission to the relevant one of the IP and SCSI interfaces 33, 34. Messages emanating from the wrapper 31 towards the IP handler 34 follow a path through the kernel 30 indicated at 81 in FIG. 4. Messages emanating from the wrapper 31 towards the SCSI protocol handler 33 follow a path through the kernel 30 indicated at 82 in FIG. 4.

On receiving a message from the module core 32, the wrapper 31 also decrements the reference counter associated with that message. The wrapper 31 then examines the value of the reference counter. If examination reveals that the value of the reference counter is greater than zero, the wrapper 31 takes no further action in respect of the PLUT element. If however examination reveals that the value of the reference counter is zero, the wrapper 31 concludes that all of the messages expected to emanate from the module core 32 as a result of the corresponding message entering the module core 32 have appeared. In this case, the wrapper 31 deletes the corresponding element of the PLUT 70 from the wrapper 31. This frees-up the memory previously used to store the pointers and the reference counter for use in respect of other messages. It will be appreciated that the wrapper 31 does not need the message to stem from a particular side of the stack of modules, e.g. the iSCSI target module 37 or the SCSI initiator module 40, but decrements the reference counter regardless of the module 37, 40 which provides the message to the wrapper 31. This is particularly useful when the response by the module core 32 to a message cannot be predicted, for instance if a reserve and release module 38 is able to reflect or pass-through a message depending on the content of the message. The wrapper 31 also includes an initiator look-up table (ILUT) 71 and a target look-up table (TLUT) 72.

When an initiator device 19-21 logs in to the kernel 30, the wrapper 31 gathers information about the initiator device 19-21. The wrapper 31 then stores a pointer in the ILUT 71 to the memory location where this information was stored by the kernel 30. For each initiator, the wrapper 31 completes a corresponding core reference in the ILUT 71. Each element includes the kernel's reference for the initiator device 19-21 and a reference for the initiator device 19-21 which is generated by the wrapper 31. The core reference in the ILUT 71 consists of a hashed value of the kernel pointer and other references to give a unique value. This reduces the computation required internally within the core when identifying and dealing with initiator references. When subsequently an initiator device 19-21 sends a message, for instance a command, to the target, the wrapper 31 intercepts it as described above. On receiving the command from the kernel 30, the wrapper 31 compares the kernel's reference for the initiator device 19-21 with elements in the ILUT 71. If the kernel's reference for the initiator device 19-21 is found in the ILUT 71, the wrapper 31 identifies the element in the ILUT 71 that corresponds to the initiator device 19-21, substitutes the kernel's reference for that initiator device 19-21 with the reference for the initiator device 19-21 generated by the wrapper 31, and passes-through the modified message to the module core 32 for handling thereby. If the initiator identifier is not found in the ILUT 71, the wrapper 31 responds to the kernel 30 with a suitable message, and does not pass any of the corresponding data to the module core 32. This prevents kernel-specific structure relating to unknown initiator devices from entering the module core 32.

When an initiator device 19-21 logs off, the log off information is intercepted by the wrapper 31, which then deletes the corresponding entry from the ILUT 71. This releases memory used by the ILUT 71 and the initiator structure of the module core 32.

When a new target device 24-26 is found, either through a scan of SCSI devices or through live notification, such is identified by the kernel 30. In the case of discovery, the list of discovered SCSI devices 24-26 is provided by the kernel 30 to the wrapper 31. In the case of live notification, the notified device or devices are notified by the kernel 30 to the wrapper 31. For each SCSI device 24-26, the wrapper 31 completes a corresponding element in the TLUT 72. Each element includes the kernel's reference for the target device 24-26 and a reference for the target device 24-26 which is generated by the wrapper 31. When the wrapper 31 intercepts a command or other message, the device identifier included in that message is compared to elements in the TLUT 72. If the target identifier is found in the TLUT 72, the wrapper 31 identifies the element in the TLUT 72 that corresponds to the target device 24-26, substitutes the kernel's reference for that target device 24-26 with the reference for the target device 24-26 generated by the wrapper 31, and passes through the modified message to the module core 32 for handling thereby. If the device identifier is not found in the TLUT 72, the wrapper 31 passes the message to the module core 32 for processing and error handling thereby.

In the above embodiment, pointers to the raw data are passed through the module core 32, and the data itself remains in the memory 13. Alternatively, the raw data can be passed through the module core 32 and the modules 37-40 along with the SCSI data messages.

Although the invention has been described applied to an iSCSI bridge 10 having two network connections, the invention is not limited to this. For instance, providing a device incorporating three different network connections can allow initiator devices of different types to access storage devices of a particular type connected on a SAN by connecting the initiator devices to different network connectors on the device. For instance, iSCSI and Fibre Channel initiators both can access SCSI storage devices by providing a device comprising a SCSI network connection and Fibre Channel and IP network connections. Alternatively, there may be plural SANs, operating according to the same or according to different protocols. The SANs may be accessible by one, two or more different types of initiator device.

Furthermore, the invention is applicable to any apparatus where handling, for instance control and/or modification, of tasks or a data stream is required, as will be appreciated by the person skilled in the art.

What is claimed is:

1. Apparatus comprising first and second network connections, a processor and memory, the processor and the memory together operating to implement a kernel, a core and a wrapper, wherein the wrapper is configured to communicatively separate the kernel and the core and wherein:
the core comprises plural software modules arranged sequentially for handling or control of data as it is passed between the first and second network connections, and
the kernel is arranged to interface to the first and second network connections,
and wherein the wrapper is configured:
to intercept a first message being processed by the kernel;
to receive a kernel reference from the kernel;
to generate an identifier;
to associate the identifier with the first message;
to store a data element comprising the kernel reference and the identifier; and
to pass the identifier with the message to the core,
the wrapper also being configured on receiving a second message from the core:
to read the identifier from the second message;
to identify a data element including the identifier;
to extract from the data element the kernel reference; and
to pass to the kernel said kernel reference and the second message.

2. Apparatus as claimed in claim 1, wherein the wrapper is arranged upon intercepting the first message to reformat data relating to the first message from a format in which it is handled by the kernel to a format in which it can be handled by the core.

3. Apparatus as claimed in claim 1, wherein the wrapper is arranged on intercepting the first message:
to monitor the number of occasions that the first message is handled by the core, and
in response to determining that the number of occasions that the first message is handled by the core is equal to an expected number, to release memory relating to the first message.

4. Apparatus as claimed in claim 1, wherein software which implements the kernel includes a command, to jump to a location outside of the kernel, and wherein a pointer is provided at the location.

5. Apparatus as claimed in claim 4, wherein the pointer is dynamically modifiable to point to the core or to the wrapper.

6. Apparatus as claimed in claim 1, wherein the wrapper is arranged:
to maintain a record of initiator devices connected to one of the network connections,
on intercepting a third message from an initiator device, determining whether the initiator device associated with the third message corresponds to an initiator device included in the record of initiator devices maintained by the wrapper, and
on a negative determination, to refrain from passing the third message to the core.

7. Apparatus as claimed in claim 6, wherein for each initiator the wrapper maintains a record including a reference for the initiator device used by the kernel and a wrapper generated reference for the initiator device.

8. Apparatus as claimed in claim 7, wherein the wrapper generated reference comprises a hashed value of the kernel reference.

9. Apparatus as claimed in claim 1, wherein the wrapper is arranged:
to maintain a record of target devices connected to one of the network connections,
on intercepting a fourth message from an initiator device, determining whether a target device associated with the fourth message corresponds to a target device included in the record of target devices maintained by the wrapper, and
on a negative determination, passing the fourth message for error handling by the core.

10. Apparatus as claimed in claim 9, wherein for each target device the wrapper maintains a record including a reference for the target device used by the kernel and a wrapper generated reference for the target device.

11. Apparatus as claimed in claim 1, wherein the kernel is constructed of open source program code.

12. A method of operating an apparatus comprising first and second network connections, a processor and memory, the processor and the memory together operating under software control to implement a kernel, a core and a wrapper, wherein the wrapper is configured to communicatively separate the kernel and the core, the core comprises plural software modules arranged sequentially for handling or control of data as it is passed between the first and second network connections, and the kernel is arranged to interface to the first and second network connections, the method comprising at the wrapper:
intercepting a first message being processed by the kernel,
generating an identifier and associating the identifier with the first message,
storing a data element comprising a kernel reference, the kernel reference having been received from the kernel, and the identifier, and
passing the identifier with the message to the core,
the method also comprising at the wrapper on receiving a second message from the core:
reading the identifier from the second message;
identifying a data element including the identifier, extracting from the data element the kernel reference, and passing to the kernel said kernel reference and the second message.

13. A memory having stored thereon machine-readable instructions which when implemented on a computer apparatus comprising first and second network connections and a processor, the processor and the memory together operating under software control to implement a kernel, a core and a wrapper, wherein the wrapper is configured to communicatively separate the kernel and the core, the core comprises plural software modules arranged sequentially for handling or control of data as it is passed between the first and second network connections, and the kernel is arranged to interface to the first and second network connections, cause the computer apparatus to perform at the wrapper a method comprising:

intercepting a first message being processed by the kernel,
generating an identifier and associating the identifier with the first message,
storing a data element comprising a kernel reference, the kernel reference having been received from the kernel, and the identifier, and
passing the identifier with the first message to the core, and on receiving a second message from the core:
reading the identifier from the second message;
identifying a data element including the identifier,
extracting from the data element said kernel reference, and
passing to the kernel said kernel reference and the second message.

* * * * *

UNITED STATES PATENT AND TRADEMARK OFFICE
CERTIFICATE OF CORRECTION

| | | |
|---|---|---|
| PATENT NO. | : 8,090,876 B2 | |
| APPLICATION NO. | : 11/724236 | |
| DATED | : January 3, 2012 | |
| INVENTOR(S) | : Steven Hayter | |

It is certified that error appears in the above-identified patent and that said Letters Patent is hereby corrected as shown below:

Column 14, Claim 4, Line 6:
Please delete "," after the word command

Signed and Sealed this
Nineteenth Day of June, 2012

David J. Kappos
*Director of the United States Patent and Trademark Office*